(12) United States Patent
Hinckley et al.

(10) Patent No.: US 7,107,538 B1
(45) Date of Patent: Sep. 12, 2006

(54) ENFORCING SECURITY ON AN ATTRIBUTE OF AN OBJECT

(75) Inventors: Mark Andrew Hinckley, Lindon, UT (US); Dale Robert Olds, Sandy, UT (US); Matthew Gerrit Brooks, Orem, UT (US)

(73) Assignee: Novell, Inc., Provo, UT (US)

( * ) Notice: Subject to any disclaimer, the term of this patent is extended or adjusted under 35 U.S.C. 154(b) by 732 days.

(21) Appl. No.: 10/242,007

(22) Filed: Sep. 12, 2002

(51) Int. Cl.
   *G06F 17/00* (2006.01)
(52) U.S. Cl. .................. 715/743; 715/741; 715/742; 707/200; 707/10
(58) Field of Classification Search ........ 715/741–743; 707/1, 2, 8–10, 100, 102; 717/162
   See application file for complete search history.

(56) References Cited

U.S. PATENT DOCUMENTS

| | | | |
|---|---|---|---|
| 4,498,132 A | 2/1985 | Ahlstrom et al. | 711/163 |
| 5,335,346 A | 8/1994 | Fabbio | 711/163 |
| 5,903,720 A | 5/1999 | Stokes | 726/4 |
| 5,903,755 A | 5/1999 | Matheson et al. | 719/315 |
| 5,913,025 A * | 6/1999 | Higley et al. | 726/4 |
| 6,044,373 A | 3/2000 | Gladney et al. | 707/10 |
| 6,173,289 B1 | 1/2001 | Sonderegger et al. | 707/103 R |
| 6,192,405 B1 * | 2/2001 | Bunnell | 709/225 |
| 6,609,108 B1 * | 8/2003 | Pulliam et al. | 705/27 |
| 6,728,685 B1 * | 4/2004 | Ahluwalia | 705/26 |
| 6,944,626 B1 * | 9/2005 | Cameron et al. | 707/103 R |

* cited by examiner

*Primary Examiner*—Tadesse Hailu
(74) *Attorney, Agent, or Firm*—Schwegman, Lundberg, Woesnner & Kluth, P.A.

(57) ABSTRACT

Methods, systems, and schema are provided for enforcing security on an attribute of an object. An instance of an object is created or modified using the schema where a number of the attributes for the object include descriptors. The attributes of the created or modified object are checked to ensure that the modifier has access rights to the attributes. If the modifier does not have the access rights, then values are not assigned to the attributes requested by the modifier. When the modifier provides values for an attribute having the corresponding descriptor, the values are also checked to determine if they are references to a second object. In which case, a check is made to ensure the modifier has an access right to the second object. If no such access right exists, then the values are not assigned to the attribute as originally requested by the modifier.

24 Claims, 3 Drawing Sheets

ENFORCING SECURITY ON AN ATTRIBUTE OF AN OBJECT

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2002, Novell, Inc., All Rights Reserved.

FIELD OF THE INVENTION

The present invention relates to enforcing security on attributes of objects, and in particular to methods, systems, and schemas used to ensure an attribute of an object does not reference another object where access is restricted.

BACKGROUND OF THE INVENTION

Ensuring security in a distributed computing environment is becoming increasingly complex. As soon as a security hole is detected and patched, another vulnerability is detected. Traditionally, security is enforced at various levels of abstraction within a distributed environment. For example, the Operating System (OS) is layered and includes a File System (FS) or Directory System (DS). Both the OS and the DS employ security techniques to prevent unintentional or malicious damage to the resources (e.g., hardware and/or software) of the distributed environment.

In order to decrease the coding complexity of conventional DSs, the DSs are modularized at various levels of abstraction similar to the design of OSs. Accordingly, some DSs use Object Oriented (OO) design and programming methodologies. In an OO approach, resources (physical and logical), organizations, applications, users, geographic locations, and the like are encapsulated as object entities within a software module. The objects include publicly available access methods and privately available access methods. The private methods are used, in part, to enforce some security since only internal or authorized users, objects, and/or applications are permitted to process the private methods. The private methods also permit the objects to hide lower levels of coding abstraction that are associated with the objects. The public methods are published and accessible to other users, objects, and/or applications and are used to communicate with the object.

Objects also include attributes or properties that can be set or accessed through a number of the public methods associated with the objects. For example, a DS object representing a user can include an attribute called GroupMembership, where one or more values assigned to the GroupMembership attribute represent other objects and/or object groups to which the user belongs. The user object can also include an attribute that identifies the directory in which the user is to be placed upon login. Moreover, as is readily apparent to one of ordinary skill in the art, a single object can be a superset of aggregation of a multitude of other objects.

Although the OO approach for DSs implementations can enforce security attributes for accesses to the objects a security hole is readily detected. For instance, a modifier (e.g., user, application, or another object) can generate an instance of an object. The modifier has access to generate the instance of the object. While defining the instance, the modifier can provide a value for an attribute of the instance. The value can be a hard coded string constant to a different object. Moreover, the different object can be a destructive operation, such as a format hard drive operation. Furthermore, the attribute of the instance can include a forced execution value, such that the modifier can assign the format hard drive operation and force its execution upon login of a user. Conventionally, the values provided for attributes are not validated to ensure that the values are not references to other objects that the modifier is not permitted to access.

The security hole is particularly noticeable when two or more systems are interfaced with one another and have access to the same object. For example, a first system, such as a calendaring system, may permit a user with proper access rights to a conference room to freely invite other users to attend a meeting in the conference room. The conference room is represented as an object within the first system, and the conference room can include a plurality of attributes such as direction information, time-of-day limitations, date limitations, invited attendees, and the like. The calendar object can also be interfaced to other systems, such as email systems, word processing systems, and/or systems that permit values of attributes defined within the calendar object to trigger the automatic execution of an external application. With conventional designs and approaches it would be perfectly permissible for a user to invite attendees to a meeting in the conference room, since on the surface this appears to be an innocuous operation (e.g., not actually modifying an attendee's calendar). But, if values provided as attributes of the conference room are also linked with other systems, such that external applications can be automatically launched, then the user could achieve something typically not permissible. For example, the user could forcibly place an entry on an attendee's calendar, or the user could do something more destructive, such as using a second system to launch a destructive application that could do damage to resources of an attendee.

As is now apparent, there exists a need for improved techniques that enforce security on attributes of objects. This is particularly useful when objects are used by two or more different systems. Furthermore, the techniques should be flexible, practical, easy to manage, integrate, and implement.

SUMMARY OF THE INVENTION

In various embodiments of the present invention, techniques for enforcing security on attributes of objects are described. A modifier uses a schema to create or modify instances of an object. If the modifier provides a value for an attribute associated with a descriptor, then the value is checked to ensure the modifier has access rights to provide the value.

More specifically and in one embodiment of the present invention, a method to enforce security on an attribute of an object is presented. A definition for a first object and one or more attribute values for the first object are received. Next, the values are checked to determine if one of the values is associated with an attribute having a descriptor. Any value associated with the descriptor is validated to determine if the value is a reference to a second object. Finally, it is determined whether a modifier of the first object has an access right to the second object before permitting the first object to be associated with the value that references the second object.

In another embodiment of the present invention, another method is provided to enforce security on an object. A descriptor to an attribute of an object is assigned in a schema for the object. A value associated with the attribute is checked when provided by a modifier using the schema and a determination is made as to whether the value references a second object. Moreover, the value is disregarded when the value references the second object and the modifier lacks proper access rights to the second object.

In still another embodiment of the present invention, a system to enforce security for an attribute of an object is described. The system includes a schema, a descriptor, and a managed object. The schema is used to define an instance of an object. The descriptor is assigned to one or more attributes of the object and defined within the schema. Further, the managed object validates values assigned to the attributes having the descriptor in order to ensure that the values reference additional objects where a modifier providing the values has access rights to the additional objects.

In yet another embodiment of the present invention, a schema residing on a computer readable medium for enforcing security on an attribute of an object is provided. The schema includes metadata and a descriptor. Moreover, the metadata is used to define instances of objects within a directory system. The descriptor is used to flag attributes associated with one or more of the instances of the object. Furthermore, the descriptor helps determine if a value assigned to one of the attributes is associated with an external object, and if so, to validate that a modifier provided value has an access right to reference the external object.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Objects include logical software representations of users, organizations, geographic locations, software applications, hardware/software resources, and the like. The objects can be embodied and implemented using traditional OO techniques or through any standard (e.g., structured) programming technique. Objects include attributes or properties. Instances of objects are defined by rules (e.g., metadata) controlled by object schemas. The object schemas can be in any data format (e.g., Extensible Markup Language (XML), Extensible Style Sheets Language (XSL), and others).

Moreover, the instances of the objects are created or generated by a modifier. The modifier can be an object, user, application, and the like. The modifier accesses an object's schema to define a permissible instance of an object or to modify an existing instance of the object. In creating or modifying an object instance, the schema will define what attributes are mandatory for the instance and what attributes are optional for the instance. In various embodiments of the present disclosure, the schema is accessible to the modifier through an Application Programming Interface (API) library and/or a Graphical User Interface (GUI) application.

Furthermore, in one embodiment, the present disclosure is implemented within a DS, such as NetWare, distributed by Novell, Inc. of Provo, Utah. In another embodiment the present disclosure is implemented within eDirectory, distributed by Novell, Inc. of Provo, Utah. Of course any DS, or DS enabled application can utilize the teaching of the present disclosure to improve security. Moreover, any application that defines objects and security for those objects can benefit from the present disclosure. All such DSs and applications are intended to fall within the broad scope of the present invention.

Figure 1:
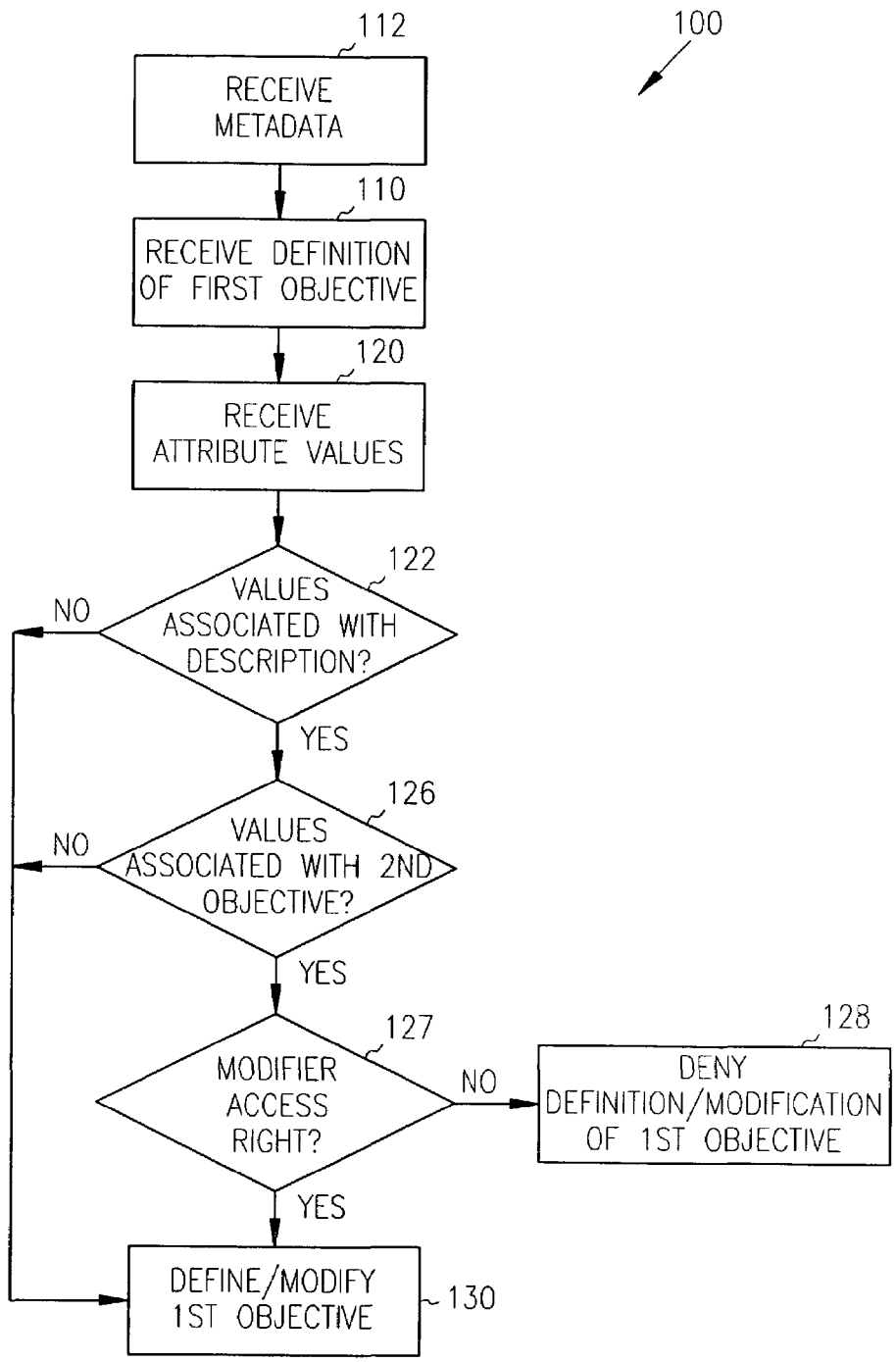
FIG. 1 is a flowchart representing a method for enforcing security on an attribute of an object, according to the teachings of the present invention.

FIG. 1 illustrates a flowchart representing one method 100 for enforcing security on an attribute of an object, according to the teachings of the present invention. Initially, a schema that defines instances of an object is provided. In some embodiments, the schema can be accessed to create or modify instances of objects through an API and/or GUI application. When the schema is defined, a number of the attributes within the schema are flagged with a descriptor. The descriptor is used to identify those attributes of an instance of an object that need to be validated in order to ensure proper security.

At 110, a definition of a first object is received from a modifier. The definition need not be a new definition of the first object, since in some embodiments; the definition is a modification to an original definition associated with the first object. The modifier can be an object, an application, and/or a user. The modifier interfaces with the schema to define or modify the first object. In some cases, at 112, some of the information provided by the modifier (e.g., directly or indirectly) is received as metadata for the first object. Metadata includes definitional information about the first object, such date created, modifier identification, and the like. The schema itself also includes metadata (e.g., rules about object instances).

The modifier also provides attribute values, at 120, for any attributes created for the first object. In some embodiments, the attribute values are supplied as string constants or hard coded values that do not require any substitution to resolve their values. At 122, a check is made to determine if any of the attribute value assignments are associated with an attribute that has a descriptor in the object schema. If none of the values are associated with attributes having a descriptor, then, at 130, the assignments are permitted and the definition or modification of the first object is concluded.

If an attribute value was assigned to an attribute with a descriptor, then, at 126, and additional check is made to determine if any of the values are associated with a second object. If no attribute values are associated with the second object, then the value assignments and the definition/modification of the first object is permitted to conclude at 130.

However, if an attribute value is associated with the second object, then yet another check is performed. Accordingly, at 127, a check is made to determine whether the modifier has an access right to the second object being referenced by one of the supplied attribute values. If the modifier lacks the access right, then, at 128, the current attempted definition or modification of the first object is denied. In some embodiments, the invalid attempt to create or modify the first object is recorded automatically as an invalid transaction. The invalid transaction can then be automatically reported to a system administrator. If the modifier has the access right to the second object, then, at 130, the value assignments and the definition or modification of the first object is permitted to conclude.

In some embodiments, the first object is a group object that includes a plurality of member objects. In more embodiments, the second object is a destructive object that can cause potential harm or damage to hardware resources, software resources, or other objects. Additionally, method 200, in some instances, is implemented in a DS.

Furthermore, in some embodiments, the check that is performed on values associated with descriptors can be implemented using a managed object. The managed object is automatically triggered to perform the appropriate checks whenever values are provided for an affected attribute. In this way, a more generic implementation is achieved, with a single managed object that is capable of performing checks on instances of objects being defined or modified by modifiers.

As one of ordinary skill in the art now appreciates, security is enforced on attributes of objects seamlessly and in a least restrictive manner. Thus, unlike conventional approaches, the present disclosure uses a schema to determine when values that are provided reference external objects and then detects the access rights of the external object relative to the modifier. Therefore, both the created/modified object instance and the external object reference are managed.

Figure 2:
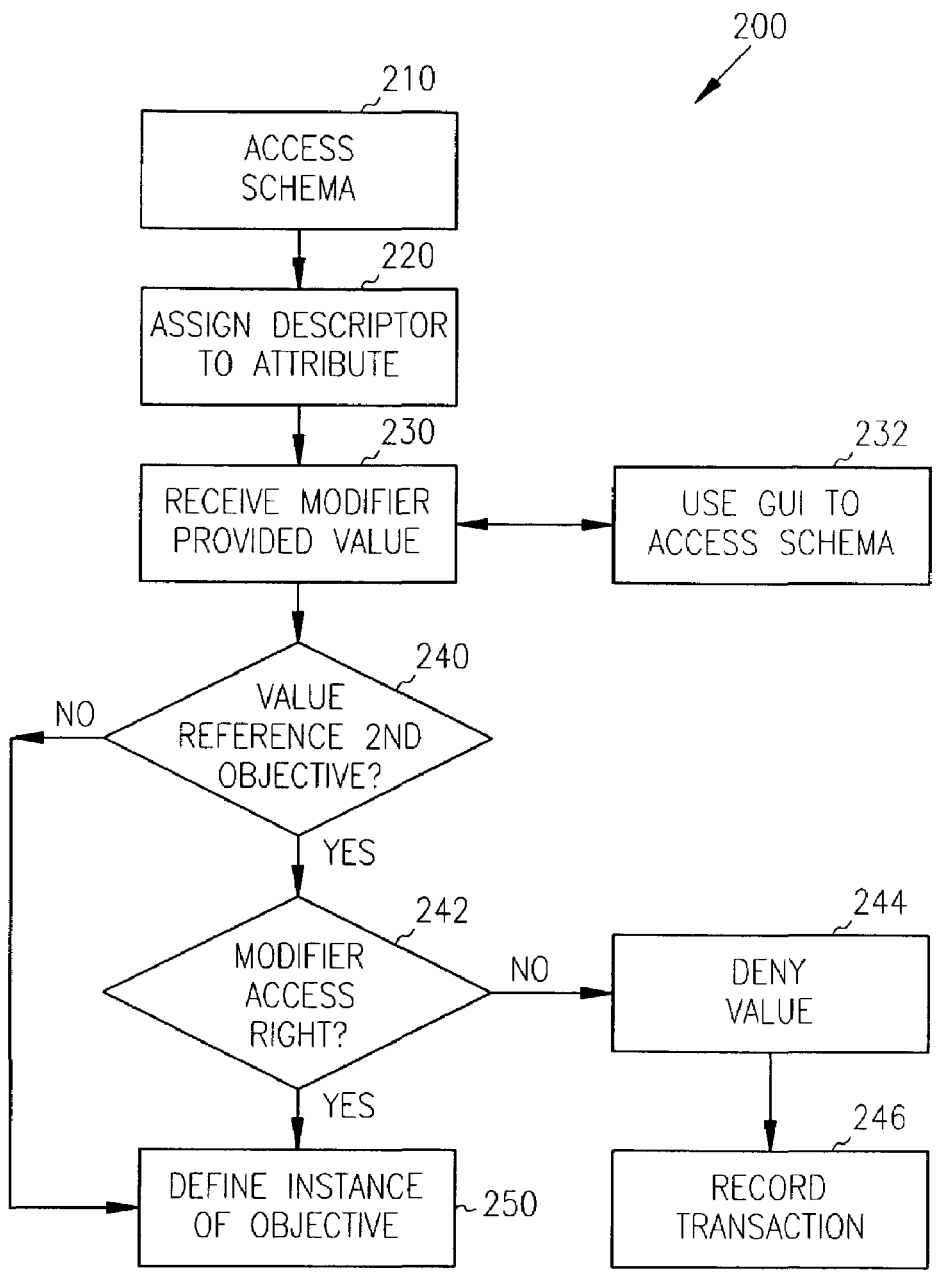
FIG. 2 is a flowchart representing another method for enforcing security on an attribute of an object, according to the teachings of the present invention.

FIG. 2 illustrates a flowchart representing another method 200 for enforcing security on an attribute of an object, according to the teachings of the present invention. Initially, one or more attributes associated with a schema for an object are assigned descriptors. The selection of the appropriate attributes is based on attributes that can accept as values references to other external objects. In some embodiments, the schema is accessible to a modifier via an API library or a GUI application. Moreover, in some cases, the schema can be in an XML data format, an XSL data format, or any other consistently defined data format.

At 210, the schema is accessed by a person or application authorized to modify and/or create schemas. At 220, while defining the schema, a descriptor is placed as a flag on one of the available attributes for instances of objects being defined by the schema. At some later point in time, once the schema is defined, a modifier accesses the schema to define or modify an object instance.

During the definition/modification of the object, a value for an attribute is received from the modifier, at 230. In some cases, the modifier accesses the schema using a GUI application as depicted at 232. When the value is received, at check is performed at 240 to determine if the value references a second object. If the value does not reference a second object, then, at 250, the definition/modification of the object instance is defined.

However, at 242, if the value does reference a second object, then a check is made to determine whether the modifier has appropriate access rights to the second object. Correspondingly, at 244, if the modifier lacks the proper access rights to the second object, then the value assignment is not permitted. Moreover, in some embodiments, the attempted value assignment is recorded as an unauthorized transaction, as depicted at 246. In this way, automatic records and notifications can be recorded and sent when unauthorized assignments are detected. This can further assist in discouraging malicious behavior, or in alerting individuals of their negligent behavior. However, if the modifier has the proper access rights, then, at 250, the definition or modification of the object instance concludes normally.

In some embodiments, a generic managed object is implemented to determine whether the value references a second object and whether the modifier has the proper access rights to make the reference to the second object. Additionally, in one embodiment, the modifier is a user or an application and the value provided is the name of a directory within a directory system. The value can also include an indication that a destructive operation is to be automatically performed when a user logs into a directory identified by the directory name.

The present disclosure permits an object instance, being defined or modified by a modifier and all references included within the instance, to be efficiently managed for security. This does not require unduly managing each available attribute with individual ACLs and the like, rather, a more generic global approach is used to flag attributes with descriptors indicating further security checks are warranted.

Figure 3:
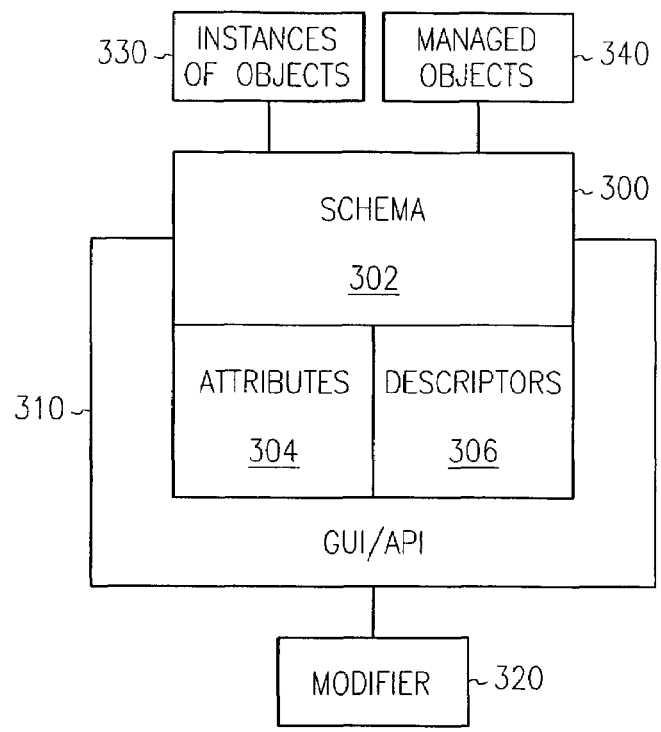
FIG. 3 is a block diagram of a system that enforces security on an attribute of an object, according to the teachings of the present invention.

FIG. 3 illustrates a block diagram of one system 300 that enforces security on an attribute of an object, according to the teachings of the present invention. The system 300 includes a schema 302, attributes 304, descriptors 306, and a managed object 340. The schema 302 defines instances of objects 330 by using rules (e.g., metadata). Schemas can be defined with commercially available tools or with ad hoc programming tools. Schemas and schema tools are well known to one of ordinary skill in the art. Thus, any tool used to create schemas, in accordance with the present disclosure, is intended to fall within the scope of the present invention.

The attributes 304 define properties and values for the object instances 330. Some attributes 304 can be mandatory, as defined by the schema 302, while other attributes 304 can be optionally available with the object instances 330. Descriptors 306 are uniquely assigned to one or more of the attributes 304 in the schema 302. The descriptors 306 are flags that are used to identify those attributes 304 that require further checking and/or validation when values are assigned to attributes 304. Descriptors 306 can be associated with those attributes 304 that are capable of including values that reference additional objects.

The schema 302, in some embodiments, is accessible via a GUI application and/or API library 310. Once the schema 302 is defined with the appropriate assignments of descriptors 306 to attributes 304, the schema is accessible to a modifier 320 who desires to use the schema 302 in order to create or modify one or more instances of objects 330 defined by the schema 302.

The managed object 340 interfaces with the schema 302 and is accessed when values are provided for attributes 304 that have descriptor 306 assignments. The managed object 340 can be used with a plurality of different schema, or it can be custom developed for use with a single specialized schema. The managed object 340 validates values assigned to attributes 304 that have descriptors 306. First, the managed object 340 determines if any provided value references an additional object not being defined or modified by the modifier 320, and if so, the managed object validates that the modifier 320 has access rights to the additional object before permitting the modifier 320 to create or modify an object instance 330 that includes the unauthorized reference.

The managed object 340 can be linked to the descriptors 306, such that when an attribute 304 receives a value, the managed object 340 is automatically processed. Alternatively, the managed object 340 can be called by a schema application when a value is provided by the modifier 320 or when the modifier attempts to save a definition for an instance of an object 330.

In some embodiments, a single instance of an object 330 can be a group object having a plurality of member objects. Additionally, in one embodiment, system 300 is implemented in a DS, and is used to manage various aspects of the DS. The system 300 uses the managed object 340 to manage any references made by a modifier 320 to additional objects that are not being defined or modified within the schema 302. In this way, all references to objects are detected in system 300 and security is improved. This is particularly useful when managing DSs.

Figure 4:
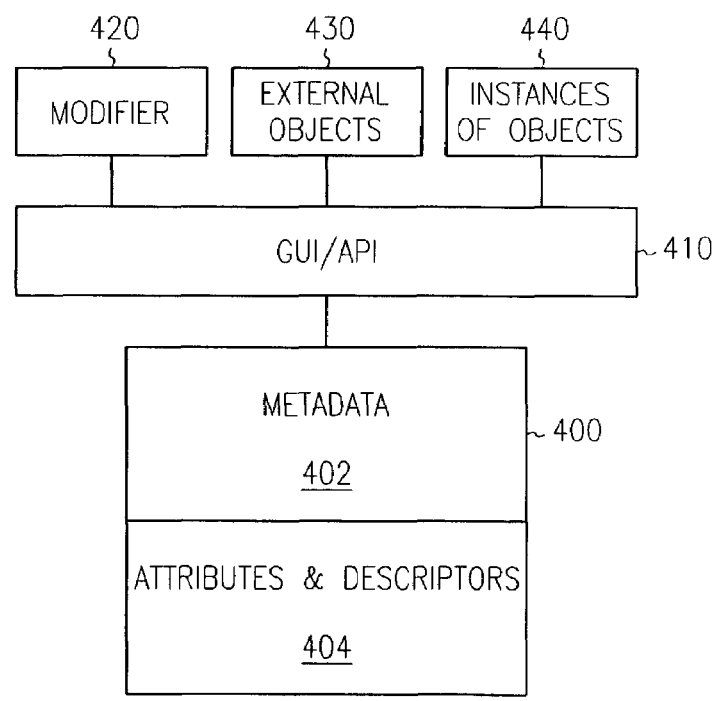
FIG. 4 is a block diagram of a schema, according to the teachings of the present invention.

FIG. 4 illustrates a block diagram of one schema 400, according to the teachings of the present invention. The schema 400 includes metadata 402, attributes and descriptors 404. The metadata 402 is used to define instances of objects 440 within a DS. For example, the metadata can include rules for instances of the objects 440, such as mandatory attributes 404 versus optional attributes 404. The schema 400 can be created via any commercially available tool or ad hoc custom developed tool.

A number of the attributes 404 include descriptors 404, the descriptors 404 are flags or indications within the schema as to attributes 404 that can have values which reference external objects 430. The descriptors 404 can be used to force checks on value assignments to the attributes 404. Moreover, if a value provided by a modifier 420 does reference an external object 430, then a check is made to ensure the modifier 420 has an access right to reference the external object 430. If the modifier 420 lacks the access right, then the value is not assigned to the desired attribute 404.

The modifier 420 can access and interact with the schema 400 to create or modify one of more instances of the objects 420 via a GUI application and/or API library 410. As previously discussed, the modifier 420 can be a user, an application, or any other object within the DS. In some instances, the value provided by the modifier 420 for assignment to an attribute 404 is a reference to an external object 430 that is a destructive executable application, which when referenced is automatically executed.

Moreover, a generic object (e.g., managed object) can perform the validations that are triggered by a value assignment to an attribute 404 having a descriptor 404. Alternatively, an application (e.g., part of the GUI/API 410, or separate there from) can perform the validations. Additionally, any unauthorized value assignments that are detected can be automatically logged and/or reported.

As one of ordinary skill in the art now appreciates upon reading the present disclosure, a single definition of an object instance can have its associated references inspected for additional security in order to ensure that external objects are not being accessed without the appropriate access rights. Thus, with the teachings presented with the present disclosure all objects within a computing environment can be more effectively managed for security and more easily maintained.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method to enforce security on an attribute of an object, comprising:

receiving a definition for a first object and one or more attribute values for the first object;

determining whether a modifier of the first object that provides the attribute values has access rights to the first object and the attribute values;

checking the values to determine if one of the values is associated with an attribute having a descriptor and wherein the descriptor is included within the definition of the first object and the descriptor indicates additional validation is to be used for values supplied for the attribute;

validating whether the value associated with the descriptor is associated with a second object; and determining whether the modifier of the first object has an access right to the first object and the second object in response to the descriptor before permitting the first object to be associated with the value that references the second object.

2. The method of claim 1 wherein in receiving the definition, the definition is metadata included within a schema for the first object.

3. The method of claim 1 wherein in receiving the definition, the first object is a group object having a plurality of member objects.

4. The method of claim 1 wherein in validating, the second object is a destructive object.

5. The method of claim 1 wherein in receiving the definition of the first object, the first object represents a user in a directory system.

6. The method of claim 1 wherein in checking the values, the values are constants.

7. The method of claim 1 wherein in checking the values, the descriptor is a managed object reference that ensures the modifier has the access right to the first and second object.

8. A method to enforce security on an object, comprising:

assigning a descriptor to an attribute of a first object in a schema for the first object, wherein the descriptor instructs that additional checking be performed for a value supplied for the attribute;

checking the value associated with the attribute when provided by a modifier using the schema; and determining if the value references a second object, and disregarding the value if the value references the second object, and the modifier lacks proper access rights to the first object and the second object.

9. The method of claim 8 wherein in assigning, the modifier uses a Graphical User Interface (GUI) to access the schema in order to define a new instance of the first object.

10. The method of claim 8 wherein in checking the value, the value is a directory name.

11. The method of claim 8 wherein in determining, a managed object determines if the modifier has the proper access rights to use the value in order to reference the second object.

12. The method of claim 8 wherein in checking, the modifier is at least one of a user and an application.

13. The method of claim 8, further comprising recording a transaction of the modifier that provides the value.

14. The method of claim 8 wherein in assigning, the schema is an Extensible Markup Language (XML) schema.

15. A system to enforce security for an attribute of an object, comprising:
   a schema for an object used to define an instance of the object;
   a descriptor that is assigned to one or more attributes of the object and defined within the schema, wherein the descriptor is to instruct that additional validations be processed if values are supplied to the one or more attributes associated with the descriptor; and
   a managed object that validates the values assigned to the attributes in response to the descriptor to ensure the values reference additional objects where a modifier providing the values has access rights to the additional objects.

16. The system of claim 15, further comprising a Graphical User Interface (GUI) used by the modifier to access the schema in order to define the instance of the object.

17. The system of claim 15 wherein the schema is used to define or modify the instance of the object, and the instance of the object is a group object.

18. The system of claim 15 wherein the system is used to manage a directory system.

19. A system to enforce security for an attribute of an object, comprising:
   a schema for an object used to define an instance of the object;
   a descriptor that is assigned to one or more attributes of the object and defined within the schema; and
   a managed object that validates values assigned to the attributes having the descriptor to ensure the values reference additional objects where a modifier providing the values has access rights to the additional objects, and wherein the modifier provides values for one of more of the attributes having the descriptor, which causes the managed object to be automatically processed.

20. A schema residing on a computer readable medium for enforcing security on an attribute of an object, comprising:
   metadata used to define instances of objects within a directory system;
   a descriptor used to flag attributes associated with one or more of the instances of the object, wherein the descriptor indicates that additional validation is to be performed against a value assigned to the attributes associated with the descriptor; and
   wherein the descriptor is also used to determine if the value assigned to the descriptor is associated with an external object, and if so, to perform the additional validation on the value to ensure that a modifier, who supplied the value, has an access right to reference the external object.

21. The schema of claim 20 wherein the schema is used to define or modify instances of the objects in the directory system.

22. The schema of claim 20 wherein the schema is used to define or modify instances of the objects, and wherein a number of the instances represent groups of objects.

23. The schema of claim 20 wherein the schema is accessible to the modifier through a Graphical User Interface (GUI).

24. A schema residing on a computer readable medium for enforcing security on an attribute of an object, comprising:
   metadata used to define instances of objects within a directory system;
   a descriptor used to flat attributes associated with one or more of the instances of the object; and
   wherein the descriptor is used to determine if a value assigned to the descriptor is associated with an external object, and if so, to validate that a modifier provided value has an access right to reference the external object, and wherein the value represents the external object, and the external object is a destructive executable application that when referenced is automatically executed.

\* \* \* \* \*

UNITED STATES PATENT AND TRADEMARK OFFICE
CERTIFICATE OF CORRECTION

| | | |
|---|---|---|
| PATENT NO. | : 7,107,538 B1 | Page 1 of 1 |
| APPLICATION NO. | : 10/242007 | |
| DATED | : September 12, 2006 | |
| INVENTOR(S) | : Hinckley et al. | |

It is certified that error appears in the above-identified patent and that said Letters Patent is hereby corrected as shown below:

In column 10, line 33, in Claim 24, delete "flat" and insert -- flag --, therefor.

Signed and Sealed this

Fifth Day of December, 2006

JON W. DUDAS
*Director of the United States Patent and Trademark Office*